(12) United States Patent
Zhang

(10) Patent No.: US 11,762,686 B2
(45) Date of Patent: Sep. 19, 2023

(54) CONTROL SYSTEM FOR ARTIFICIAL INTELLIGENCE DEVICE AND METHOD THEREOF

(71) Applicant: Shenzhen Chenbei Technology Co., Ltd., Shenzhen (CN)

(72) Inventor: Wenguang Zhang, Shenzhen (CN)

(*) Notice: Subject to any disclaimer, the term of this patent is extended or adjusted under 35 U.S.C. 154(b) by 596 days.

(21) Appl. No.: 17/039,947

(22) Filed: Sep. 30, 2020

(65) Prior Publication Data

US 2021/0182100 A1    Jun. 17, 2021

(30) Foreign Application Priority Data

Dec. 17, 2019  (CN) .......................... 201911321698.6

(51) Int. Cl.
*G06F 9/48*     (2006.01)
*G06N 20/00*    (2019.01)
*G06F 9/38*     (2018.01)

(52) U.S. Cl.
CPC .......... *G06F 9/4881* (2013.01); *G06F 9/3836* (2013.01); *G06N 20/00* (2019.01)

(58) Field of Classification Search
CPC .... G06F 9/4881; G06F 9/3836; G06F 9/4887; G06F 9/4843; G06N 20/00; G06N 5/04
See application file for complete search history.

(56) References Cited

U.S. PATENT DOCUMENTS

| | | | |
|---|---|---|---|
| 2020/0104397 A1* | 4/2020 | Fan | G06F 9/52 |
| 2021/0067406 A1* | 3/2021 | Myers | G06F 11/3409 |
| 2021/0117291 A1* | 4/2021 | Tang | G06F 11/1466 |
| 2021/0182069 A1* | 6/2021 | Upadhyaya | G06F 9/3851 |

* cited by examiner

*Primary Examiner* — Sisley N Kim
(74) *Attorney, Agent, or Firm* — Tsz Lung Yeung

(57) ABSTRACT

A method of controlling work tasks for an artificial intelligence device includes the steps of: (a) receiving, by a receiving module, work task information, the work task information including a plurality of to-do tasks and a corresponding expected completion time frame, (b) retrieving, by a retrieval module, an execution number at which each of the to-do tasks is to be performed, and (c) determining, by a determination module, a first implementation number of execution times based on the work task information and the execution numbers, and determining a target task of each of the execution times, the target task is at least one of the to-do tasks.

19 Claims, 6 Drawing Sheets

CONTROL SYSTEM FOR ARTIFICIAL INTELLIGENCE DEVICE AND METHOD THEREOF

CROSS REFERENCE TO RELATED APPLICATION

This is a non-provisional application which claims priority to a Chinese patent application having an application number of CN 201911321698.6, and a filing date of Dec. 17, 2019, the entire contents of which is hereby incorporated by reference.

BACKGROUND

Field of Invention

Embodiments of the present disclosure relates to a control system for an artificial intelligence device and a method thereof, which is capable of minimizing the need for requiring user's input control.

Description of Related Arts

With the advance of artificial intelligence, a wide variety of smart devices have been developed and utilized. Conventional smart devices are usually turned on or off according to individual user controls. Each operation of the smart device may need to be operated by a corresponding user's control. Therefore, conventional smart devices require considerable users' controls, users' operations and users' settings. Thus, the operations of conventional smart devices largely depend on users' operation and this substantially undermines the "intelligence" of conventional smart devices.

SUMMARY

Implementations of the present disclosure provide a control system for an artificial intelligence device and a method thereof, which is capable of minimizing the need for requiring user's input control.

In one aspect of the present disclosure, it provides a method of controlling work tasks for an artificial intelligence device, comprising the steps of:

(a) receiving, by a receiving module in at least one of a server and an artificial intelligence device, work task information, the work task information including a plurality of to-do tasks and a corresponding expected completion time frame;

(b) retrieving, by a retrieval module in at least one of the server and the artificial intelligence device, an execution number at which each of the to-do tasks is to be performed; and (c) determining, by a determination module in at least one of the server and the artificial intelligence device, a first implementation number of execution times based on the work task information and the execution numbers, and determining a target task of each of the execution times, the target task is at least one of the to-do tasks.

In another aspect of the present disclosure, it provides a method of controlling work tasks for an artificial intelligence device, comprising the steps of:

(a') receiving, by at least one of a server and an artificial intelligence device, work task information, the work task information including at least a first time period of a first date, at least a second time period of a second date, a plurality of to-do tasks and a corresponding expected completion time frame;

(b') retrieving, by at least one of a server and an artificial intelligence device, an execution number at which each of the to-do tasks is to be performed; and (c') determining, by at least one of a server and an artificial intelligence device, a first implementation number of first execution times based on the work task information and the execution numbers, and determining a target task of each of the first execution times, the target task is at least one of the to-do tasks, the first execution times being within the first time period of the first date; and (d') determining, by at least one of a server and an artificial intelligence device, a first implementation number of second execution times based on the work task information and the execution numbers, and determining a target task of each of the second execution times, the target task is at least one of the to-do tasks, the second execution times being within the second time period of the second date.

In another aspect of the present disclosure, it provides a control system for an artificial intelligence device and a server, comprising:

a receiving module provided in at least one of the artificial intelligence device and the server, and arrange to receive work task information, the work task information including a plurality of to-do tasks and a corresponding expected completion time frame;

a retrieval module provided in at least one of the artificial intelligence device and the server, and arranged to receive an execution number at which each of the to-do tasks is to be performed; and a determination module provided in at least one of the artificial intelligence device and the server, and arranged to determine a first implementation number of execution times based on the work task information and the execution numbers, and determining a target task of each of the execution times, the target task is at least one of the to-do tasks.

In another aspect of the present disclosure, it provides a control system for an artificial intelligence device and a server, comprising:

a receiving module provided in at least one of the artificial intelligence device and the server, and arranged to receive work task information, the work task information including at least a first time period of a first date, at least a second time period of a second date, a plurality of to-do tasks and a corresponding expected completion time frame;

a retrieval module provided in at least one of the artificial intelligence device and the server, and arranged to receive an execution number at which each of the to-do tasks is to be performed;

a first determination module provided in at least one of the artificial intelligence device and the server, and arranged to determine a first implementation number of the first execution times based on the work task information and the execution numbers, and determine a target task of each of the first execution times, the target task being at least one of the to-do tasks, the first execution times being within the first time period of the first date; and a second determination module provided in at least one of the artificial intelligence device and the server, and arranged to determine a first implementation number of second execution times based on the work task information and the execution numbers, and determine a target task of each of the second execution times, the target task being at least one of the to-do tasks, the second execution times being within the second time period of the second date.

This summary presented above is provided merely to introduce certain concepts and not to identify any key or essential features of the claimed subject matter.

DETAILED DESCRIPTION OF THE PREFERRED EMBODIMENT

The following detailed description of the embodiments is the preferred mode of carrying out the present disclosure. The description is not to be taken in any limiting sense. It is presented for the purpose of illustrating the general principles of embodiments of the present disclosure.

It should be appreciated that the terms "install", "connect", "couple", and "mount" in the following description refer to the connecting relationship in the accompanying drawings for easy understanding of embodiments of the present disclosure. For example, the connection can refer to permanent connection or detachable connection. Furthermore, "connected" may also mean direct connection or indirect connection, or connection through other auxiliary components. Therefore, the above terms should not be an actual connection limitation of the elements of embodiments of the present disclosure.

It should be appreciated that the terms "length", "width", "top", "bottom", "front", "rear", "left", "right", "vertical", "horizontal", "upper", "lower", "exterior", and "interior" in the following description refer to the orientation or positioning relationship in the accompanying drawings for easy understanding of embodiments of the present disclosure without limiting the actual location or orientation of embodiments of the present disclosure. Therefore, the above terms should not be an actual location limitation of the elements of embodiments of the present disclosure.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of embodiments of the present disclosure.

Figure 1:
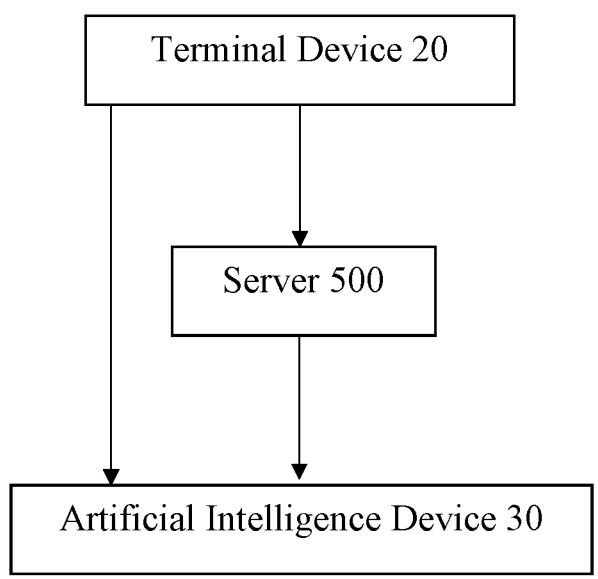
FIG. 1 is a schematic diagram of an artificial intelligence device controlled by a server and a terminal device according to a first preferred embodiment of the present invention.
Figure 2:
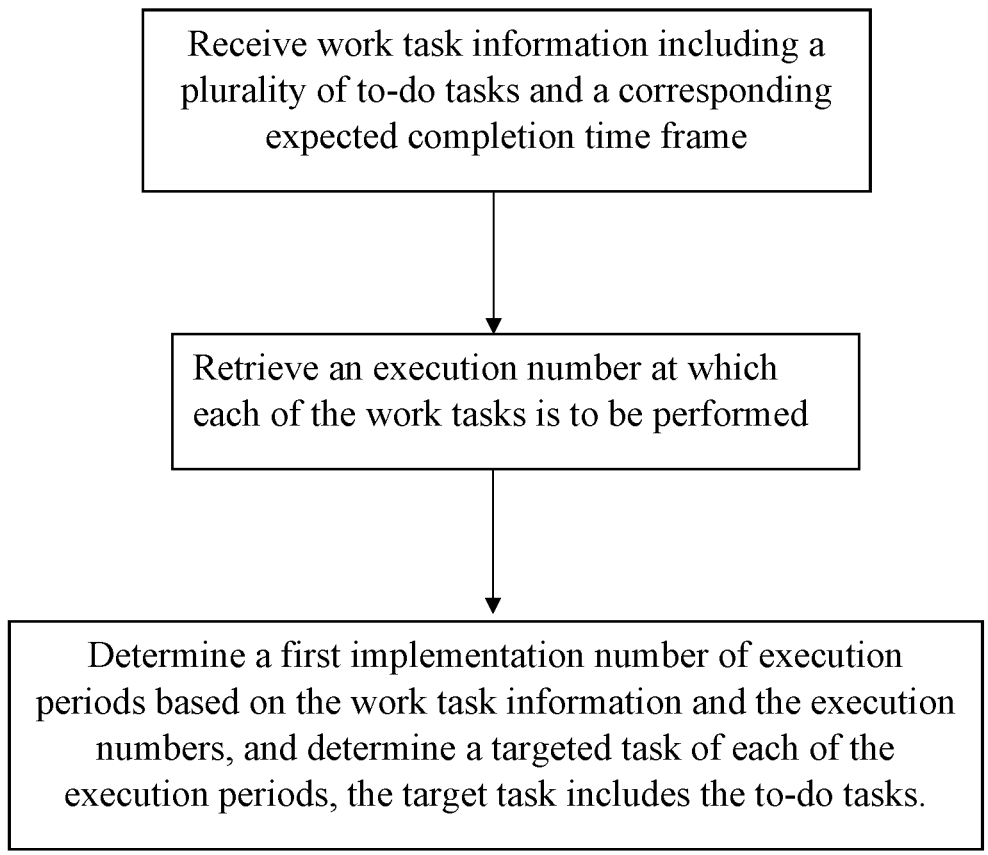
FIG. 2 is flow diagram of a method of controlling work tasks for an artificial intelligence device according to the first preferred embodiment of the present invention.
Figure 3:
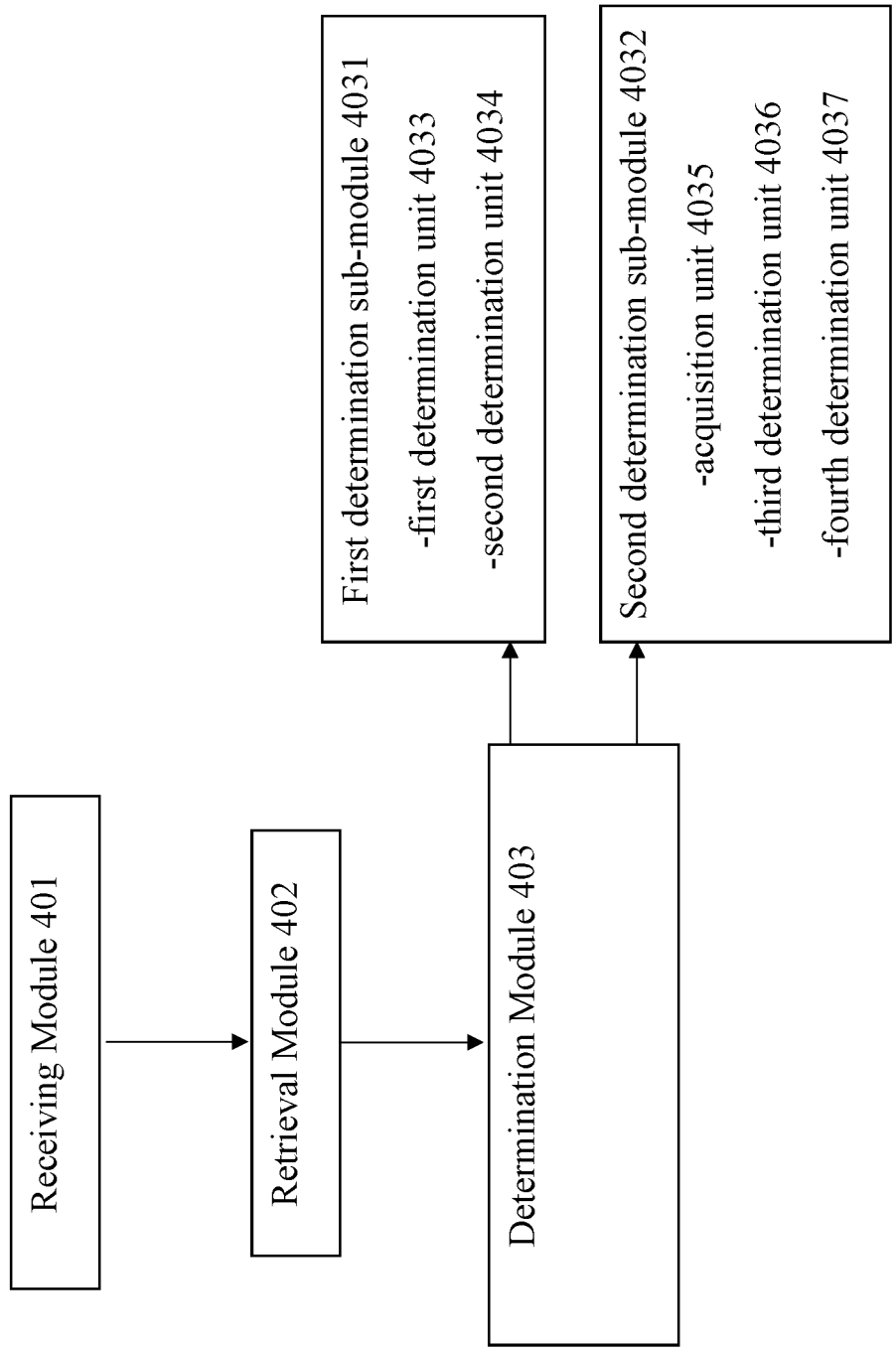
FIG. 3 is a block diagram of the control system for an artificial intelligence device according to a first preferred embodiment of the present invention.

Referring to FIG. 1 to FIG. 3 of the drawings, a method of controlling work tasks for an artificial intelligence device 30 according to a first preferred embodiment of the present disclosure is illustrated. Broadly, the method comprises the steps of:

(a) receiving, by a receiving module 401 in at least one of a server 500 and an artificial intelligence device 30, work task information, the work task information including a plurality of to-do tasks and a corresponding expected completion time frame;

(b) retrieving, by a retrieval module 402 in at least one of a server 500 and an artificial intelligence device 30, an execution number at which each of the to-do tasks is to be performed; and (c) determining, by a determination module 403 in at least one of a server 500 and an artificial intelligence device 30, a first implementation number of execution times based on the work task information and the execution numbers, and determining a target task of each of the execution times, the target task is at least one of the to-do tasks.

Referring to FIG. 1 of the drawings, the above control method may be used in conjunction with a control system. The control system be implemented on at least one of a server 500 and an artificial intelligence device 30. The server 500 may be communicated with a terminal device. The artificial intelligence device 30 may be communicated with the server 500. The communication may be made through Internet or any predetermined network.

The terminal device 20 may be configured as a portable electronic device held by a user, such as a smartphone, a tablet computer, or any wearable devices. The terminal device 20 may be communicated with the server 500 so that the user may be able to initialize commands or control signals through the terminal device 20. Such commands or control signals may be transmitted (wired or wirelessly) to the server 500 through the predetermined network.

Note that as a slight alternative, the terminal device 20 and the artificial intelligence device 30 may communicate with each other directly without going through the server 500. In this alternative, a user may be to control the operation of the artificial intelligence device 30 through the terminal device 20 without involving the server 500.

On the other hand, the artificial intelligence device 30 may be configured as a wide variety of electrical appliances implementing artificial intelligence, such as smart light apparatus, smart flower pot, smart fish tank, smart electrical adapter etc. A user may be able to control operations of the artificial intelligence device 30 through the terminal device 20. For example, a user may input setting to the terminal device 20 controlling that the artificial intelligence device 30 (as a smart lighting apparatus) to turn on illumination at a predetermined time interval.

As shown in FIG. 3 of the drawings, the control method described above may be accomplished through a control system for an artificial intelligence device 30 and a server 500, comprising:

a receiving module 401 provided in at least one of the artificial intelligence device 30 and the server 500, and arrange to receive work task information, the work task information including a plurality of to-do tasks and a corresponding expected completion time frame;

a retrieval module 402 provided in at least one of the artificial intelligence device 30 and the server 500, and arranged to receive an execution number at which each of the to-do tasks is to be performed; and a determination module 403 provided in at least one of the artificial intelligence device 30 and the server 500, and arranged to determine a first implementation number of execution times based on the work task information and the execution numbers, and determining a target task of each of the execution times, the target task is at least one of the to-do tasks.

In step (a) described above, the work task information may be initiated or entered by the user through the terminal device 20. The work task information may then be transmitted to the server 500 or directly to the artificial intelligence device 30. The work task information may include a plurality of to-do tasks and the expected completion time frames for each to-do task.

It is worth mentioning that the number of to-do tasks may be corresponding to the specific type of artificial intelligence device 30. For example, when the artificial intelligence device 30 is configured as a smart lighting apparatus, the to-do tasks may be "turning on light", "turning off light" or "dimming light" etc. As another example, when the artificial intelligence device 30 is configured as a smart flower pot, the to-do tasks may just be "irrigating plants".

The expected completion time frame may be a specific time frame during which the to-do tasks are carried out. For example, the expected completion time frame may be specified as having a start time of 10:00 am and an end time of 11:00 am. Thus, step (a) may comprise a step of specifying a start time and an end time for each expected completion time frame. In the context of a smart lighting apparatus, a lighting period may be set as 10:00 am to 11:00 am, so that in this period of time, light will be turned on. More than one to-do task may be assigned in this expected completion time frame.

Step (a) may further comprise the step of processing the work task information sent by one of a server 500 or a terminal device 20. The work task information may be processed for allowing the control system to command the artificial intelligence device 30 to carry out.

In step (b), each of the to-do tasks may be given a number of execution time. That is to say, step (b) specifies the number of times each of the to-do tasks is to be carried out for the expected completion time frame. Take lighting apparatus as an example again, a "turning on light" task and a "turning off light" task may be specified within a time frame of 10:00 am to 11:00 am. However, the execution number for each of these to-do tasks may be set as 5. In other words, within this expected completion time frame, each of the "turning light on" task and the "turning off light" task must be carried out 5 times.

The execution number may be pre-stored in the artificial intelligence device 30 or inputted by the user through the terminal device 20. Thus, step (b) may comprise a step of storing, by at least one of the server 500 or the artificial intelligence device 30, in database, at least one execution number for each to-do task of the work task information stated in step (a) above. The pre-stored execution number may be a predetermined execution number determined by the manufacturer of the artificial intelligence device 30 based on different circumstances in which the artificial intelligence device 30 is to be marketed.

The execution number may also be set by user and carried in the task information.

Take lighting apparatus as an example again, a "turning on light" task, a "turning off light" task, and a "dimming light" may be specified within a time frame of 8:00 pm to 11:00 pm. However, the execution number for each of these to-do tasks may be set as 1. In other words, within this expected completion time frame, each of the "turning on light" task, a "turning off light" task, and a "dimming light" may be carried out only once.

Step (c) may comprise the step of randomly setting the first implementation number of the execution times, and determining a predetermined target task of each of the execution times.

In this step, the artificial intelligence device 30 may randomly set the first implementation number and the corresponding target tasks. These steps minimize the need for human intervention and enhance the "smartness" of the artificial intelligence device 30.

As a slight alternative of step (c), it may comprise the step of determining a predetermined number of execution times and the execution number by reference to the to-do tasks, the corresponding expected completion time frame in step (a), and the execution number in step (b).

Step (c) may be carried out by the determination module 403. The determination module 403 may comprise a first determination sub-module 4031 and a second determination sub-module 4032. The first determination sub-module 4031 may be arranged to set the first implementation number of the execution times based on corresponding work task information. The second determination sub-module 4032 may be arranged to set the target task for each of the execution times.

Take smart lighting apparatus as the artificial intelligence device 30 as an example, the expected completion time frame may be set as 20:00 to 23:00. There may be three execution times within this expected completion time frame (i.e. the first implementation number is three). These three execution times may be set as 20:00, 21:30 and 23:00, in which a target task of turning the light on may be set at 20:00 (i.e. the first execution time), a target task of dimming the light may be set at 21:30 (i.e. the second execution time), while a target task of turning the light off may be set at 23:00 (i.e. the third execution time).

It is worth mentioning that, in step (c) above, the setting of the execution times and the target tasks may be carried out by the determination module 403 implemented in the artificial intelligence device 30, so that the server 500 may only assume the role of communication between the terminal device 20 and the artificial intelligence device 30. Alternatively, the steps may also be carried out by the determination module 403 implemented in the server 500 so that the setting of the execution times and the target tasks may be controlled in the server 500, instead of in the artificial intelligence device 30. The relationship between the to-do tasks and the target tasks is that, all to-do tasks are inputted in step (a), while a corresponding to-do task will become a target task in step (c) where the to-do task is carried out the implantation number of times and at the specific execution times.

For example, the first implementation number may be determined by the number of to-do tasks multiply by the execution number.

As an example, when the artificial intelligence device 30 is configured as the smart lighting apparatus, and it requires to execute three "turning on light" operations and three "turning off light" operations in the period between 10:00 and 11:00, the number of to-do tasks may be set as 2 while the execution number may be set as 3. The first implementation number may then be determined by 3×2=6. Therefore, within the time period between 10:00 and 11:00, there will be altogether 6 execution times which correspond to the first implementation number being 6. The execution times may be set as 10:10, 10:20, 10:30, 10:40, 10:50 and 11:00, in which "turning on light" operations may be carried out at 10:10, 10:30, and 10:50, while "turning off light" operations may be carried out at 10:20, 10:40, and 11:00.

The execution times may be determined by a predetermined algorithm based on a number of predetermined conditions. The predetermined conditions may include:

$$T_1 \leq T_a + 2 \times (T/M)$$

$$T_2 \geq T_b - 2 \times (T/M)$$

$$T_i - T_{i-1} \leq 3 \times (T/M)$$

where $T_1$ is a first execution time, $T_2$ is the last execution time, $T_a$ is the start time, $T_b$ is the end time, T is the expected completion time frame, M is the first implementation number, and $T_i$ is ith execution time.

These algorithms may be pre-programmed in the determination module 403 implemented in the artificial intelligence device 30 or the server 500. For each of the execution times obtained by the above-mentioned algorithm, the corresponding target task may be carried out by the artificial intelligence device 30.

The execution times may be determined by the steps of inputting the expected completion time frame and the first implementation number into an execution time acquisition model to obtain the first implementation number of the execution times, wherein the execution time acquisition module is arranged to ascertain a corresponding execution times based on a predetermined reference model. The reference model may be built upon by various sample expected completion time frame, various sample implementation numbers and various sample execution times using specific mathematical models, such as Q-learning model. The execution time acquisition model may be utilized to automatically obtain the execution times by just inputting the expected completion time frame and the first implementation number. The determination may be obtained by predetermined models built by a lot of sample data.

Accordingly, the first determination sub-module 4031 may comprise a first determination unit 4033 arranged to set the first implementation number of the execution times based on corresponding work task information, and a second determination unit 4034 arranged to set the execution times of the expected completion time frame. Moreover, the second determination unit 4034 may further be arranged to set the execution times based on a number of predetermined conditions. Those predetermined conditions are described above, and may include:

$$T_1 \leq T_a + 2 \times (T/M)$$

$$T_2 \geq T_b - 2 \times (T/M)$$

$$T_i - T_{i-1} \leq 3 \times (T/M)$$

where $T_1$ is a first execution time, $T_2$ is the last execution time, $T_a$ is the start time, $T_b$ is the end time, T is the expected completion time frame, M is the first implementation number, and $T_i$ is ith execution time.

Moreover, the second determination unit 4034 may further be arranged to determine execution times by inputting the expected completion time frame and the first implementation number into an execution time acquisition model to obtain the first implementation number of the execution times, wherein the execution time acquisition model is arranged to ascertain a corresponding execution times based on a predetermined reference model.

Step (c) may comprise the steps of:
when more than one to-do task is inputted, arranging a sequence of the to-do tasks to be executed, in such a manner that such arrangement must fulfill first sequencing condition, the first sequencing condition being that the first target task is different from an initial status of the artificial intelligence device 30, while each of the subsequent target tasks is different from a previous target task.

Take the smart lighting apparatus as an example again, the to-do tasks may have "full light" operation, "dimmer" operation and "no light" operation. The smart lighting apparatus may be in an initial status of operation, such as "dimmer" operation. This means the lighting apparatus is in a status where the light is switched to a dimmer or low-light condition. Since the sequence of the to-do tasks must fulfill the first sequencing condition mentioned above, the first target task may either be arranged as "full light" operation or as "no light" operation. When the first target task is arranged as "no light" operation, the second target task may be arranged as "full light" operation, and the third target task may be arranged as "dimmer operation".

On the other hand, when the first target task is arranged as "full light" operation, the second target task may be arranged as "dimmer" operation, and the third target task may be arranged as "no light operation".

Thus, when the sequence of the to-do tasks is determined, the exact to-do task which is to be carried out in each execution time (which become target tasks) can also be ascertained. It is worth mentioning that the sequence of the target tasks may also be pre-set in the artificial intelligence device 30 or the server 500.

The sequence arrangement may also be subject to a second sequencing condition in addition to the first sequencing condition. The second sequencing condition is that the last target task is the same as the initial status of the artificial intelligence device 30. For example, if the to-do tasks are represented by A, B, C and D, and the initial status of operation is A, the possible sequence of the target tasks when the first sequencing conditions and the second sequencing conditions are met are BCDA, BDCA, CDBA, CBDA, DCBA or DBCA.

When the sequence of the target tasks has been determined, suppose the first implementation number is 8, and the sequence has been determined as BCDA, and suppose the execution times are sequentially designated as a, b, c, d, e, f, g, and h. Each of the execution times may then be designated a specific target task which corresponds to one of the to-do tasks. An exemplary sequence may be a-B, b-C, c-D, d-A, e-B, f-C, g-D, and h-A, where a-B expresses the situation where in the execution time a, target task B will be executed.

Thus, the second determination sub-module 4032 may comprise an acquisition unit 4035 arranged to a acquire a sequence arrangement of the to-do tasks to be executed to become a sequence of sequence arrangement of the target tasks, in such a manner that such sequence arrangement must fulfill the first sequencing condition, the first sequencing condition being that the first target task is different from an initial status of the artificial intelligence device 30, while each of the subsequent target tasks is different from a previous target task. Moreover, the sequence arrangement may also be subject to a second sequencing condition in addition to the first sequencing condition. The second sequencing condition is that the last target task is the same as the initial status of the artificial intelligence device 30.

The second determination sub-module 4032 may further comprise and a third determination unit 4036 arranged to ascertain the target tasks of each of the execution times.

It is worth mentioning that step (a) through step (c) mentioned above may be performed by the determination module 403 implemented in either the server 500 or the artificial intelligence device 30. Thus, the control method may further comprise the steps of:

(d) transmitting, by the server 500 to the artificial intelligence device 30, the target task for each of the execution times when step (a) to step (c) are performed by the server 500; and (e) executing, by the artificial intelligence device 30, the target task for each of the execution times.

The above disclosure may be illustrated by a number of examples. In one exemplary illustration, a user may perform a setup to an artificial intelligence device 30 through the terminal device 20. The expected completion time frame is set to be Oct. 1, 2019 between 5:00 am to 6:00 am. The to-do tasks are represented by A, B and C. The first implementation number is set to be 6. The executed time periods may be represented by a, b, c, d, e, and f. The target tasks for these executed time periods are A, B, C, A, B, C respectively.

Figure 4:
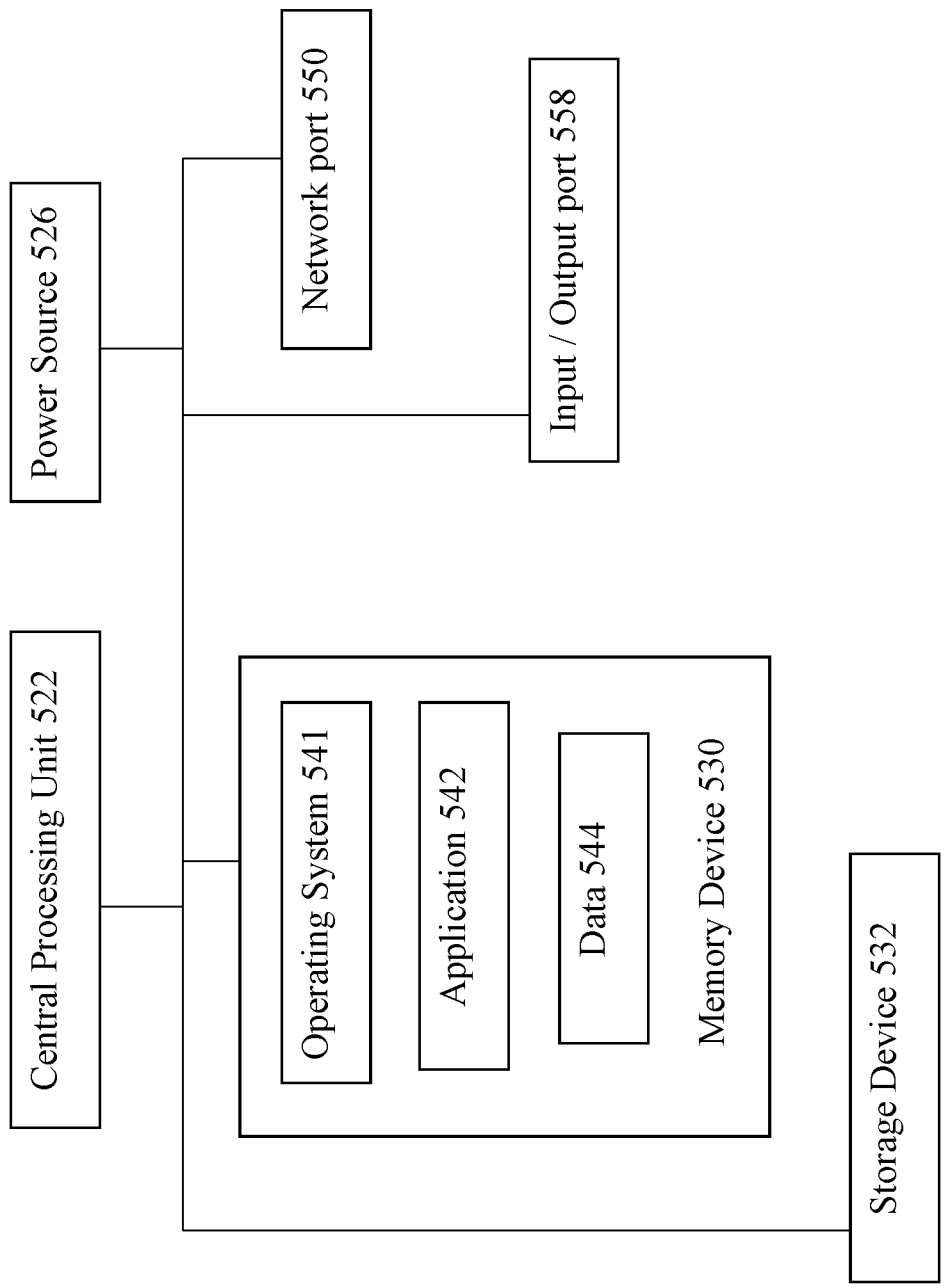
FIG. 4 is another block diagram illustrating the control system for an artificial intelligence device according to a first preferred embodiment of the present invention.

Referring to FIG. 4 of the drawings, the various components of the control system 500 as mentioned above may be implemented on at least one central processing unit 522 and a storage device 532, through at least one specifically designed operating system 541 and/or application 542 and corresponding data 544 stored in at least one memory device 530. The storage device 532 and the memory device 530 may be provided on either one or both of the server 500 and the artificial intelligence device 30. Each of the memory device 530 and the storage device 532 may be configured as Random Access Memory (RAM), Read-Only Memory (ROM), hard drive or other types of memory apparatuses.

Moreover, each of the modules mentioned above may be a set of instructions and data 544 stored in the storage device 532 or the memory device 530 and executed by the central processing unit 522.

The server 500 may comprise at least one power source 526, a network port 550, and an input/output port 558. The server 500 may be operated by a predetermined operating system.

It is worth mentioning that the various modules of the control system described above may be incorporated in a hardware, such as a chip or a circuitry, or in separate hardware.

Figure 5:
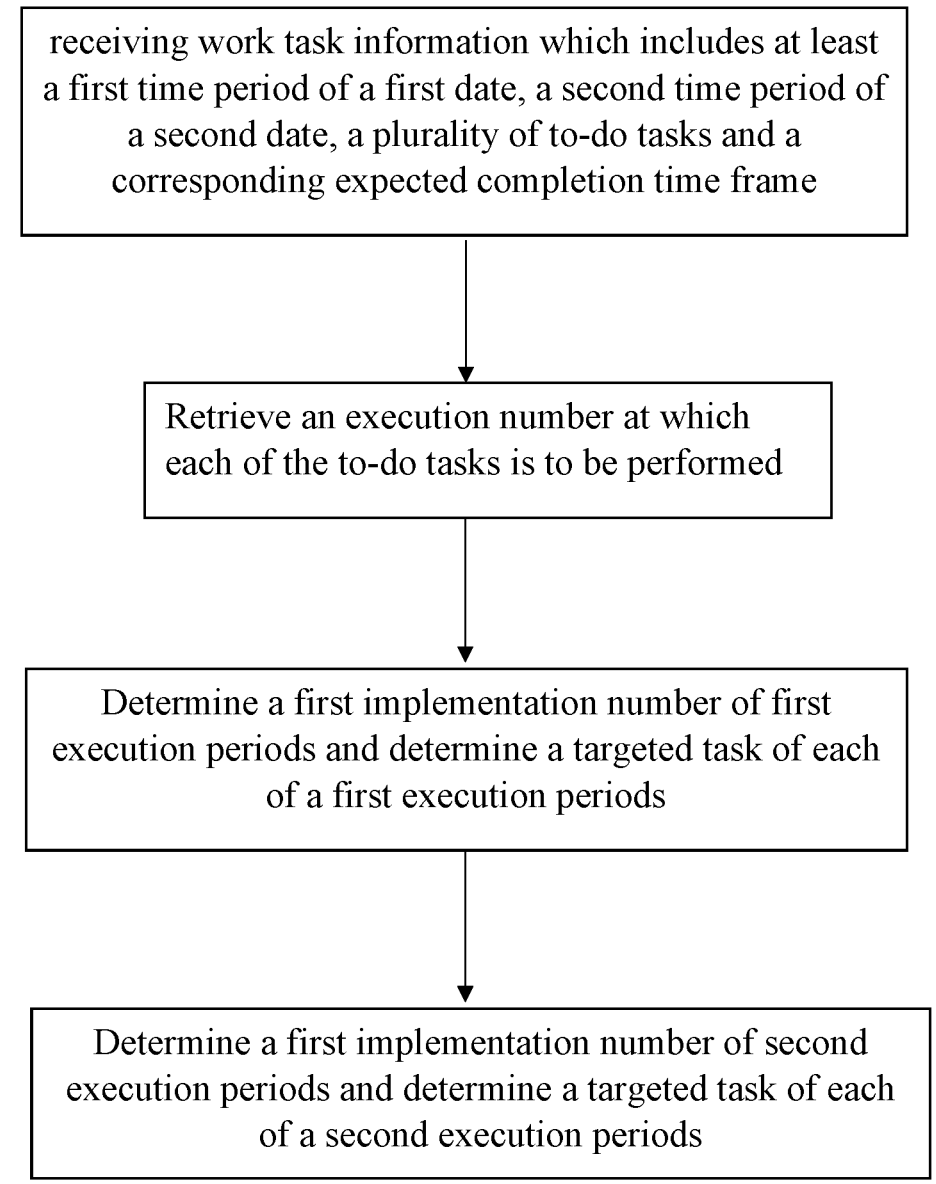
FIG. 5 is flow diagram of a method of controlling work tasks for an artificial intelligence device according to a second preferred embodiment of the present invention.
Figure 6:
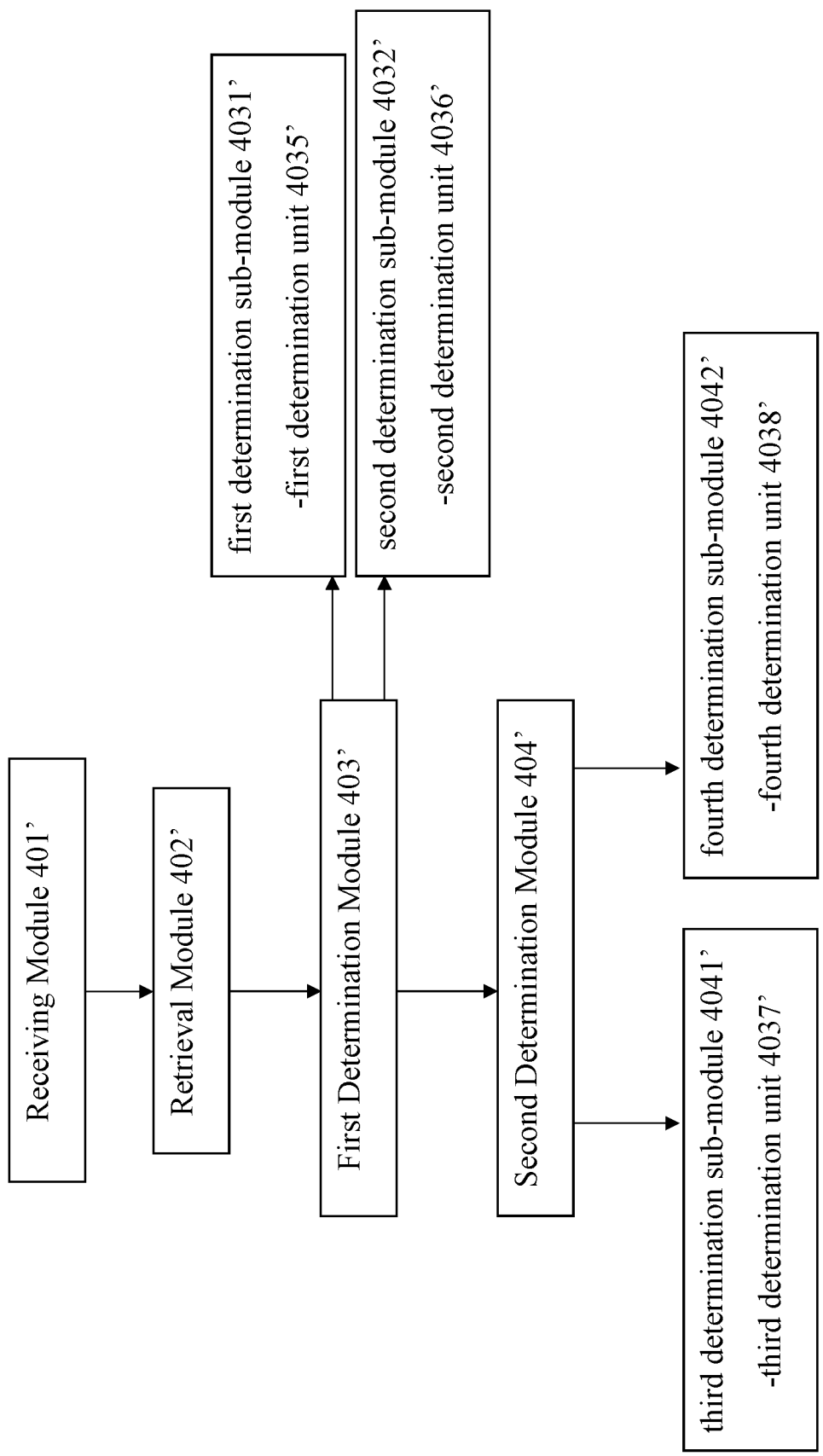
FIG. 6 is a block diagram of the control system for an artificial intelligence device according to the second preferred embodiment of the present invention.

Referring to FIG. 5 to FIG. 6 of the drawings, a method of controlling work tasks for an artificial intelligence device according to a second preferred embodiment of the present disclosure is illustrated. Broadly, the method comprises the steps of:

(a') receiving, by a receiving module 401' in least one of a server 500 and an artificial intelligence device 30, work task information, the work task information including at least a first expected completion time frame of a first date, at least a second expected completion time frame of a second date, and a plurality of to-do tasks;

(b') retrieving, by a retrieval module 402' in at least one of a server 500 and an artificial intelligence device 30, an execution number at which each of the to-do tasks is to be performed; and (c') determining, by a first determination module 403' in at least one of a server 500 and an artificial intelligence device 30, a first implementation number of first execution times based on the work task information and the execution numbers, and determining a target task of each of the first execution times, the target task is at least one of the to-do tasks, the first execution times being within the first time period of the first date; and (d') determining, by a second determination module 404' in at least one of a server 500 and an artificial intelligence device 30, a first implementation number of second execution times based on the work task information and the execution numbers, and determining a target task of each of the second execution times, the target task is at least one of the to-do tasks, the second execution times being within the second time period of the second date.

In this second preferred embodiment, the first execution times and the second execution times may be identical, partially identical, or not identical at all.

The method stated in this second preferred embodiment may be utilized in a situation where user may be absent from home for several days. For example, the work task information may include the to-do tasks of a first time period T1 of date A, and the to-do tasks of a second time period T2 of date B. It is worth mentioning that T1 and T2 can be the same or different time periods of two different date. The first execution times and the second execution times may be identical, partially identical (such as T1 has first execution times a, b, c d and T2 has second execution times c, d, e, f), or not identical at all.

Moreover, step (a') through step (d') mentioned above describes that the work task information for first time period and the second time period. However, the steps mentioned above may be utilized for more than two time periods.

As in the first preferred embodiment, the first implementation number of the first time period and the second time period may be determined by the number of to-do tasks and the execution number.

Referring to FIG. 6 of the drawings, the control method according to the second preferred embodiment may be accomplished by a control system for an artificial intelligence device 30 communicating with a server 500, comprising:

a receiving module 401' provided in at least one of the artificial intelligence device 30 and the server 500, and arrange to receive work task information, the work task information including at least a first time period of a first date, at least a second time period of a second date, a plurality of to-do tasks;

a retrieval module 402' provided in at least one of the artificial intelligence device 30 and the server 500, and arranged to receive an execution number at which each of the to-do tasks is to be performed; and a first determination module 403' provided in at least one of the artificial intelligence device 30 and the server 500, and arranged to determine a first implementation number of the first execution times based on the work task information and the execution numbers, and determining a target task of each of the first execution times, the target task is at least one of the to-do tasks, the first execution times being within the first time period of the first date;

a second determination module 404' provided in at least one of the artificial intelligence device 30 and the server 500, and arranged to determine a first implementation number of second execution times based on the work task information and the execution numbers, and determining a target task of each of the second execution times, the target task is at least one of the to-do tasks, the second execution times being within the second time period of the second date; and an execution module provided in at least one of the artificial intelligence device 30 and the server 500, and arranged to execute the target task of each of the first execution times and the second execution times.

The first determination module 403' may comprise a first determination sub-module 4031' arranged to determine a first implementation number and the first execution times based on the work task information and the execution numbers. The first determination sub-module 4031' may comprise a first determination unit 4035' arranged to determine the first implementation number based on the number of to-do tasks and the execution numbers, and a second determination unit 4036' arranged to determine a first implementation number of the first execution times for the first time period. The first execution time may be determined by a predetermined algorithm described below.

The first determination module 403' may comprise a second determination sub-module 4032' arranged to determine the target task for each of the first execution times.

The first execution times may be determined by a predetermined algorithm based on a number of predetermined conditions. The predetermined conditions may include:

$$T_1 \leq T_a + +2\times(T/M)$$

$$T_2 \geq T_b - 2\times(T/M)$$

$$T_i - T_{i-1} \leq 3\times(T/M)$$

where $T_1$ is a first timing of the first execution time, $T_2$ is the last timing of the first execution time, $T_a$ is the start time, $T_b$ is the end time, T is the expected completion time frame, M is the first implementation number, and $T_i$ is ith timing of the first execution time.

The first execution times may be determined by the steps of inputting the expected completion time frame and the first implementation number into an execution time acquisition module to obtain the first implementation number of the first execution times, wherein the execution time acquisition module is arranged to ascertain a corresponding first execution times based on a predetermined reference model as described in the first preferred embodiment above.

This step may be performed by the second determination unit 4036'. Thus, the second determination unit 4036' may be arranged to input the expected completion time frame and the first implementation number into an execution time acquisition module to obtain the first implementation number of the first execution times.

Moreover, step (c') may comprise the steps of:

when more than one to-do task is inputted, arranging a sequence of the to-do tasks to be executed, in such a manner that such arrangement must fulfill first sequencing condition, the first sequencing condition being that the first target task is different from an initial status of the artificial intelligence device 30 for the first execution times, while each of the subsequent target task is different from a previous target task.

Thus, when the sequence of the target tasks is determined, the exact target task which is to be carried out in each of first execution times can also be ascertained. It is worth mentioning that the sequence of the target tasks may also be pre-set in the artificial intelligence device 30 or the server 500.

The sequence arrangement may also be subject to a second sequencing condition in addition to the first sequencing condition. The second sequencing condition is that the last target task is the same as the initial status of the artificial intelligence device 30 for the first execution times.

These steps may be performed by the second determination sub-module 4032'. Thus, the second determination sub-module 4032' may be arranged to arranging a sequence of the target tasks to be executed, in such a manner that such arrangement must fulfill first sequencing condition, the first sequencing condition being that the first target task is different from an initial status of the artificial intelligence device 30 for the first execution times, while each of the subsequent target tasks is different from a previous target task.

Similarly, the second execution times may also be determined by a predetermined algorithm based on a number of predetermined conditions. The predetermined conditions may include:

$$T_1 \leq T_a + +2\times(T/M)$$

$$T_2 \geq T_b - 2\times(T/M)$$

$$T_i - T_{i-1} \leq 3\times(T/M)$$

where $T_1$ is a first timing of the second execution time, $T_2$ is the last timing of the second execution time, $T_a$ is the start time, $T_b$ is the end time, T is the expected completion time frame, M is the first implementation number, and $T_i$ is ith timing of the second execution time.

The second execution times may be determined by the steps of inputting the expected completion time frame and the first implementation number into an execution time acquisition module to obtain the first implementation number of the second execution times, wherein the execution time acquisition module is arranged to ascertain a corresponding second execution times based on a predetermined reference model as described in the first preferred embodiment above.

As in the first preferred embodiment, the first determination module 403' may comprise a first determination sub-module 4031' and a second determination sub-module 4032'. The first determination sub-module 4031' may be arranged to set the first implementation number of the first execution times based on corresponding work task information. The second determination sub-module 4032' may be arranged to set the target task for each of the first execution times.

The second determination module 404' may comprise a third determination sub-module 4041' and a fourth determination sub-module 4042' arranged to determine the target task of each of the second execution times. The third determination sub-module 4041' may be arranged to determine the first implementation number and the second execution times based on the work task information and the execution numbers. The third determination sub-module 4041' may comprise a third determination unit 4037' arranged to determine the first implementation number based on the number of to-do tasks and the execution numbers, and a fourth determination unit 4038' arranged to determine a first implementation number of the second execution times for the second time period. The second execution times may be determined by a predetermined algorithm described above.

Moreover, the fourth determination unit 4038' may be arranged to input the expected completion time frames and the first implementation number into an execution time acquisition module to obtain the first implementation number of the second execution times, wherein the execution time acquisition module may be arranged to ascertain a corresponding second execution times based on a predetermined reference model as described in the first preferred embodiment above.

Moreover, step (d') may comprise the steps of:
when more than one to-do task is inputted, arranging a sequence of the target tasks to be executed, in such a manner that such arrangement must fulfill first sequencing condition, the first sequencing condition being that the target task is different from an initial status of the artificial intelligence device 30 for the second execution times, while each of the subsequent targets is different from a previous target task.

The sequence arrangement may also be subject to a second sequencing condition in addition to the first sequencing condition. The second sequencing condition is that the last target task is the same as the initial status of the artificial intelligence device 30 for the second execution times.

Note that the execution times and the execution number may be determined by a specific algorithm. For example, the first implementation number may be determined by the number of to-do tasks multiply by the execution number. Moreover, the execution number for each of the to-do tasks may be pre-set.

Thus, the fourth determination sub-module 4042' may be arranged to determine a sequence of the targets to be executed, in such a manner that such arrangement must fulfill first sequencing condition, the first sequencing condition being that the first target task is different from an initial status of the artificial intelligence device 30 for the second execution times, while each of the subsequent target tasks is different from a previous target task.

Note that the sequence arrangement may also be subject to a second sequencing condition in addition to the first sequencing condition. These conditions may be carried out by the fourth determination sub-module 4042'. The second sequencing condition is that the last target task is the same as the initial status of the artificial intelligence device 30 for the second execution times.

It is worth mentioning that step (a') through step (d') mentioned above may be performed by the control system implemented in either the server 500 or the artificial intelligence device 30. Thus, the control method may further comprise the steps of:
(e') transmitting, by the server 500 to the artificial intelligence device 30, the target task for each of the first execution times and the second execution times when step (a') to step (d') are performed by the server 500; and
(f) executing, by the artificial intelligence device 30, the target task for each of the first execution times and the second execution times.

Moreover, as mentioned above, the first execution times and the second execution times may be partially identical, or not identical at all.

Thus, step (d') may further comprise a step of adding, by at least one of the first determination module 403' and the second determination module 404', a time constant to at least one of the first execution times and adopting the result to form the corresponding second execution time. For example, when a particular first execution time is 10:00 am and the time constant is 5 minutes, adding 5 minutes to 10:00 am yields 10:05 am as a corresponding second execution time.

Note that the time constant in this second preferred embodiment may be a positive constant or negative constant. For negative time constant, the corresponding execution time may be subtracted by the time constant. Moreover, the above time constant adding or subtracting step may be performed to the first execution times or the second execution times.

Thus, as an alternative, step (d') may further comprise a step of adding, by at least one of the first determination module 403' and the second determination module 404', a time constant to at least one of the second execution times and adopting the result to form the corresponding first execution time. For example, when a particular second execution time is 10:00 am and the time constant is 5 minutes, adding 5 minutes to 10:00 am yields 10:05 am as a corresponding first execution time.

The above disclosure may be illustrated by a number of examples. In one exemplary illustration, a user may perform a setup to an artificial intelligence device 30 through the terminal device 20. The expected completion time frame may be set to be Oct. 1, 2019 between 10:00 pm to 11:00 pm (first time period of first date). The to-do tasks may be represented by A, B and C. The first implementation number may be set to be 3. The first executed time periods may be represented by a, b, and c. The to-do tasks for these first executed time periods may be A, B, C respectively.

The second time period of the second date may be set to be Oct. 2, 2019 between 10:00 pm to 11:00 pm. The second execution times may be set to be a, b, and d (the to-do tasks are A, B, C respectively). The third time period of the third date may be set to be Oct. 3, 2019 between 10:00 pm to 11:00 pm. The third execution times may be set to be d, e and f (the to-do tasks are A, B, C respectively).

In another exemplary illustration, a user may perform a setup to an artificial intelligence device 30 through the terminal device 20. The expected completion time frame may be set to be Oct. 1, 2019 between 10:00 pm to 11:00 pm (first time period of first date). The to-do tasks may be represented by A, B and C. The first implementation number may be set to be 3. The first executed time periods may be represented by a, b, and c. The to-do tasks for these first executed time periods may be A, B, C respectively.

The second time period of the second date may be set to be Oct. 2, 2019 between 10:00 pm to 11:00 pm. The second execution times may be set to be a, b, and d, where d=c+5 mins, wherein the to-do tasks are A, B, C respectively. The third time period of the third date may be set to be Oct. 3, 2019 between 10:00 pm to 11:00 pm. The third execution times may be set to be d, e and f, where d=a−5 mins, e=b−5 mins and f=c−5 mins, wherein the to-do tasks are A, B, C respectively.

Embodiments of the present disclosure, while illustrated and described in terms of disclosed embodiments and several alternatives, is not limited to the particular description contained in this specification. Additional alternative or equivalent components could also be used to practice embodiments of the present disclosure.

What is claimed is:

1. A method of controlling work tasks for an artificial intelligence device, comprising the steps of:
   (a) receiving, by a receiving module in at least one of a server and an artificial intelligence device, work task information, said work task information including a plurality of to-do tasks and a corresponding expected completion time frame;
   (b) retrieving, by a retrieval module in at least one of said server and said artificial intelligence device, an execution number at which each of said to-do tasks is to be performed; and
   (c) determining, by a determination module in at least one of said server and said artificial intelligence device, a first implementation number of execution time based on said work task information and said execution numbers, and determining a target task of each of said execution time, said target task being at least one of said to-do tasks.

2. The method, as recited in claim 1, wherein in said step (c), said first implementation number is determined by said number of to-do tasks multiply by said execution number.

3. The method, as recited in claim 1, wherein said execution time is determined by a predetermined algorithm based on a number of predetermined conditions, said predetermined conditions including $T_1 \leq T_a+2\times(T/M)$, $T_2 \geq T_b-2\times(T/M)$ and $T_i-T_{i-1} \leq 3\times(T/M)$, where $T_1$ is a first execution time, $T_2$ is said last execution time, $T_a$ is said start time, $T_b$ is said end time, T is said expected completion time frame, M is said first implementation number, and $T_i$ is ith execution time.

4. The method, as recited in claim 1, wherein said execution times are determined by a step of inputting said expected completion time frame and said first implementation number into an execution time acquisition model to obtain said first implementation number of said execution times, wherein said execution time acquisition module is arranged to ascertain a corresponding execution times based on a predetermined reference model.

5. The method, as recited in claim 1, wherein said step (c) comprises a step of: when more than one to-do task is inputted, arranging a sequence of said to-do tasks to be executed, in such a manner that such arrangement is arranged to fulfill a first sequencing condition, said first sequencing condition being that a first of said target task is different from an initial status of said artificial intelligence device, while each of subsequent target tasks is different from a previous target task.

6. The method, as recited in claim 5, wherein said step (c) comprises a step of: when more than one to-do task is inputted, arranging a sequence of said to-do tasks to be executed, in such a manner that such arrangement is arranged to fulfill a second sequencing condition, wherein said second sequencing condition being a last of said target task is the same as said initial status of said artificial intelligence device.

7. A method of controlling work tasks for an artificial intelligence device, comprising the steps of:
(a') receiving, by a receiving module in least one of a server and an artificial intelligence device, work task information, said work task information including at least a first completion time frame of a first date, at least a second completion time frame of a second date, and a plurality of to-do tasks;
(b') retrieving, by a retrieval module in at least one of a server and an artificial intelligence device, an execution number at which each of said to-do tasks is to be performed; and
(c') determining, by a first determination module in at least one of a server and an artificial intelligence device, a first implementation number of first execution times based on said work task information and said execution numbers, and determining a target task of each of said first execution times, said target task being at least one of said to-do tasks, said first execution times being within said first time period of said first date; and
(d') determining, by a second determination module in at least one of a server and an artificial intelligence device, a first implementation number of second execution times based on said work task information and said execution numbers, and determining a target task of each of said second execution times, said target task being at least one of said to-do tasks, said second execution times being within said second time period of said second date.

8. The method, as recited in claim 7, wherein said first execution times and said second execution times are determined by a step of inputting said first expected completion time frame and said second expected completion time frame and said first implementation number into an execution time acquisition model to obtain said first implementation number of said first execution times and said second execution times, wherein said execution time acquisition module is arranged to ascertain a corresponding first execution time or a second execution time based on a predetermined reference model.

9. The method, as recited in claim 7, wherein said step (c') comprises a step of: when more than one to-do task is inputted, arranging a sequence of said to-do tasks to be executed, in such a manner that such arrangement is arranged to fulfill a first sequencing condition, said first sequencing condition being that a first of said target task is different from an initial status of said artificial intelligence device for said first execution times, while each of subsequent target tasks is different from a previous target task for said first execution times.

10. The method, as recited in claim 9, wherein said step (c') further comprises a step of: when more than one to-do task is inputted, arranging a sequence of said to-do tasks to be executed, in such a manner that such arrangement is arranged to fulfill a second sequencing condition, wherein said second sequencing condition being a last of said target task is the same as said initial status of said artificial intelligence device for said first execution times.

11. The method, as recited in claim 7, wherein said step (d') further comprises a step of adding, by at least one of said first determination module and said second determination module, a time constant to at least one of said first execution times and adopting result to form said corresponding second execution time.

12. The method, as recited in claim 7, wherein said step (d') further comprises a step of adding, by at least one of said first determination module and said second determination module, a time constant to at least one of said second execution times and adopting result to form said corresponding first execution time.

13. The method, as recited in claim 7, wherein said first execution times are determined by a predetermined algorithm based on a number of predetermined conditions, said predetermined conditions including $T_1 \leq T_a++2\times(T/M)$, $T_2 \geq T_b-2\times(T/M)$ and $T_i-T_{i-1} \leq 3\times(T/M)$, where $T_1$ is a first of said first execution times, $T_2$ is said last of said first execution times, $T_a$ is said start time, $T_b$ is said end time, T is said expected completion time frame, M is said first implementation number, and $T_i$ is ith first execution time.

14. A control system for an artificial intelligence device and a server, comprising:
a receiving module provided in at least one of said artificial intelligence device and said server, and arrange to receive work task information, said work task information including a plurality of to-do tasks and a corresponding expected completion time frame;
a retrieval module provided in at least one of said artificial intelligence device and said server, and arranged to receive an execution number at which each of said to-do tasks is to be performed; and
a determination module provided in at least one of said artificial intelligence device and said server, and arranged to determine a first implementation number of execution times based on said work task information and said execution numbers, and to determine a target task of each of said execution times, said target task being at least one of said to-do tasks.

15. The control system, as recited in claim 14, wherein said determination module comprises a first determination sub-module and a second determination sub-module, said first determination sub-module being arranged to set said first implementation number of said execution times based on said corresponding work task information, said second determination sub-module being arranged to set said target task for each of said execution times.

16. The control system, as recited in claim 15, wherein said first determination sub-module comprises a first determination unit arranged to set said first implementation number of said execution times based on corresponding work task information, and a second determination unit arranged to set said execution times of said expected completion time frame.

17. The control system, as recited in claim 16, wherein said second determination sub-module may comprises an acquisition unit arranged to acquire a sequence arrangement of said to-do tasks to be executed to become a sequence of sequence arrangement of said target tasks, in such a manner that such sequence arrangement is arranged to fulfill a first sequencing condition and a second sequencing condition, wherein said first sequencing condition is that a first of said target task is different from an initial status of said artificial intelligence device, while each of said subsequent target tasks is different from a previous target task, wherein said second sequencing condition is that said last target task is said same as said initial status of said artificial intelligence device.

18. The control system, as recited in claim 17, wherein said second determination sub-module further comprises and a third determination unit arranged to ascertain said target task of each of said execution times.

19. A control system for an artificial intelligence device and a server, comprising:
a receiving module provided in at least one of said artificial intelligence device and said server, and arranged to receive work task information, said work task information including at least a first completion time frame of a first date, at least a second completion time frame of a second date, and a plurality of to-do tasks;
a retrieval module provided in at least one of said artificial intelligence device and said server, and arranged to receive an execution number at which each of said to-do tasks is to be performed;
a first determination module provided in at least one of said artificial intelligence device and said server, and arranged to determine a first implementation number of first execution times based on said work task information and said execution numbers, and determine a target task of each of said first execution times, said target task being at least one of said to-do tasks, said first execution times being within said first completion time frame of said first date; and
a second determination module provided in at least one of said artificial intelligence device and said server, and arranged to determine a first implementation number of second execution times based on said work task information and said execution numbers, and determine a target task of each of said second execution times, said target task being at least one of said to-do tasks, said second execution times being within said second completion time frame of said second date.

* * * * *